TELEPHONE ANSWERING DEVICES WITH REMOTE CONTROL

Filed Feb. 7, 1963 2 Sheets-Sheet 1

INVENTOR.
DAVID M. GOODMAN

BY [signature]

ATTORNEY

TELEPHONE ANSWERING DEVICES WITH REMOTE CONTROL

INVENTOR.
DAVID M. GOODMAN

BY [signature]

ATTORNEY 3,383,469
TELEPHONE ANSWERING DEVICES WITH REMOTE CONTROL
David M. Goodman, 3843 Debra Court, Seaford, N.Y. 11783
Filed Feb. 7, 1963, Ser. No. 256,883
16 Claims. (Cl. 179—6)

This invention relates to subscriber operated automatic telephone answering and message recording devices. In particular, it relates to such devices which are provided with control means that enable the subscriber to use the device from a remote location.

Telephone answering devices which deliver a previously recorded announcement message in response to an incoming call and which are capable of recording incoming messages are now becoming economically practical and increasingly popular. It has been recognized for some time that it would be desirable in such devices for the owner, or subscriber, to be able to control the device from a remote location. With this remote control feature it is unnecessary for the subscriber to return to his home, or office, to enjoy the benefits of his answering device. As was the case with early telephone answering machines, however, most of the prior attempts to provide remote control features have resulted in devices which have been unduly complicated and expensive.

Generally speaking, these prior attempts to provide remote control have made use of four techniques. The earliest technique employed the transmission of different audio frequencies over the telephone line. These frequencies were coded into a given sequence and a section of the answering device was designed to be responsive to this code. Another technique employed the use of a separate private telephone line by which the subscriber controlled his answering device. A third technique, which dispensed with the second private line, employed each wire of a telephone line for different control purposes. In this arrangement, described in U.S. Patent 2,868,880, each conductor has a circuit completed to ground. A fourth technique removes the answering device from the subscriber's premises and provides instead a master recording system located at a central exchange. These techniques have serious limitations either in cost or in operational convenience, sometimes in both, and therefore have not met with much success. Citing some of the deficiencies, the use of an audio code now requires the subscriber to carry with him a device for generating the coded signals which are to be transmitted. The use of a second telephone line is inefficient and costly. Using each wire of a telephone line for different ringing currents requires the use of a ground or third wire connection; or it requires polarized ringing currents. And, removing the answering device from the subscriber's premises not only complicates the answering mechanism but it creates a tremendous message storage problem at the central exchange.

Accordingly, it is the primary objective of this invention to provide a simple, reliable, convenient to use, and inexpensive remote control device for all automatic subscriber operated telephone answering machines.

It is another object of this invention to provide the aforesaid remote control device in combination with a particular automatic telephone answering and message recording device.

It is another object of this invention to provide a remote control device where only the subscriber has complete control over the manipulation thereof.

And it is still another object of this invention to provide a feature whereby the operating telephone company may assist the subscriber in making use of his remote control device.

Other objects and advantages will become apparent from the description of this invention in this specification which is to be taken in conjunction with the accompanying drawing wherein.

Figure 1:
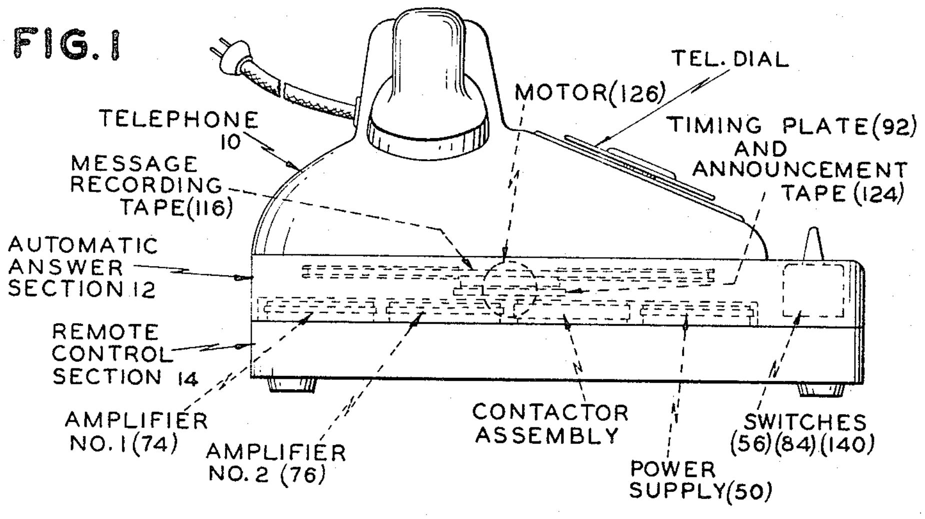
FIGURE 1 illustrates a subscriber's telephone with an automatic answering section and a remote control section.

Briefly stated, the overall objects of this invention are achieved by providing the answering device with means for generating audible, spaced apart, signal tones which inform the subscriber when he calls from a location remote from his premises when he is to insert his special code for remote control; by providing the subscriber with an easily remembered special code which he dials into the telephone at the remote location; and by providing control means at the subscriber's premises responsive to the thus-coded dialing pulses.

Three typical operating procedures will be outlined. First: assume that the subscriber, who is away from home, desires to hear the incoming messages recorded during his absence. Also, assume that for this purpose the code 3–7–3 was previously assigned. Then, the subscriber proceeds to dial his home telephone number in the usual fashion. His answering device will respond. Along with an announcement message the subscriber will hear 1400 cycle beeps akin to that required to comply with the regulations of the FCC. After the first beep, the subscriber dials the digit 3; after the second beep he dials 7; and after the third beep he dials 3. As will be explained when the drawing is discussed in detail, the remote control section of the telephone answering device responds to this special code, and the recorded messages are played back and transmitted to the subscriber. Since the subscriber uses the dial member of the instrument with which he is placing the call, since he need only recall a simple three numbered code, and since he is instructed when to dial, it is clear that this is a very attractive and easy-to-implement operational procedure.

Second: suppose that a person other than the subscriber places a call to his home phone. The answering device will respond, and the announcement message will be delivered to the calling party. Spaced apart audible signals will be transmitted along with the above announcement message, as was previously the case. Normally these instruction signals will be ignored by the calling party. Consider the possibility, however, that due to malicious intent, or for other reasons, the calling party desires to make unauthorized use of the remote control features of the device. He will be in poor position to do so. With a decoding section such as just outlined having three counters and nine effective numbers, he will have to make a proper selection from 9×9×9 or 729 numbers. Even with a decoding section of two counters, each having nine numbers, he will have 81 possible combinations to dial. Further, even a decoder with one counter can provide freedom from tampering since this single counter can be connected in circuit during a selected portion of the announcement cycle. Thus, if the announcement cycle is divided into three parts, as per the above described operational procedure, the single counter can give 3×9 or 27 codes. Still further arrangements are immediately suggested but they need not be described for the point is clear—making unauthorized use of the remote control features of this answering device is strongly discouraged.

Third: when a subscriber, whose device has recorded messages in his absence, desires to control his answering device from a remote location and he finds that he receives a "no-answer" condition he knows that the storage capacity of his machine has been used up. Normally, this is desirable in that an ordinary calling party would be disappointed, if not disturbed, to be instructed via a pre-recorded announcement to leave a message and then find this was not possible; or worse, to find later that he delivered a message that was not recorded. In the subscriber's case, however, this "no-answer" condition deprives him of the use of the remote control features of his device. It is then, for reasons which will become clear, that the subscriber communicates with the telephone operator and requests access to his machine. The telephone operator provides a special ringing current. The device responds; the spaced apart audio instruction signals are transmitted to the subscriber; and the recorded messages are played back after the subscriber dials his 3–7–3 code.

To describe how these desirable results are achieved reference is now made to the drawing where in FIG. 1 a representation appears of a telephone 10, the components of which are in circuit with an automatic answering unit 12, which has a remote control portion 14. For complete details on the answering unit 12, reference is made to U.S. Patent 2,928,898 issued to E. R. Salzberg et al. on Mar. 15, 1960. In this specification reference will be made only to those features and component parts of the patent which are necessary to explain this invention. For those features which are thus recited a numeration akin to that used in the patent are assigned to the various component parts. Thus, the major components of the answering section shown in FIG. 1 are power supply 50, amplifiers 74 and 76, motor 126, timing plate 92, announcement message storing tape 124, a contactor assembly for making electrical connections to the timing plate, incoming message recording tape 116, and three subscriber operated switches 56, 84 and 140. Not shown in FIG. 1 of the drawing but essential to the overall operation are means responsive to the ringing current which sets the answering section into operation, a relay for connecting and disconnecting the instrument with the telephone line, three stationary recording heads, and the various wires which make the connections between the circuit elements of answering section 12 and the circuit elements of the telephone 10.

The compactness of the answering unit, it is to be noted, stems from the arrangement in the aforesaid U.S. Patent 2,928,898. There are four basic reasons for this compact structure. First, the various components of the telephone unit and of the answering unit, which normally are considered as separate entities, are integrated into a combined circuit arrangement thereby removing redundant parts. Second, a single reversible, dual speed, motor is employed in a fixed cycle mode thereby dispensing with complicated clutch mechanisms and solenoids. Third, the handset of the telephone itself is used to record announcement messages and to play back recorded messages. And fourth, only three manually operated switches are provided to enable the subscriber to perform all the ordinary useful functions associated with automatic answering and message recording devices.

The remote control section now to be discussed also is compact in size. In part, the reason is the same. Namely, the elements of the remote control section are in circuit with the elements of the answering section thereby making it unnecessary to add components or elements whose functions already are provided by the parent unit. To make it easier to note this advantage, parentheses are placed about the numerals in the different figures which refer to component parts already provided in the anwsering unit.

Figure 2:
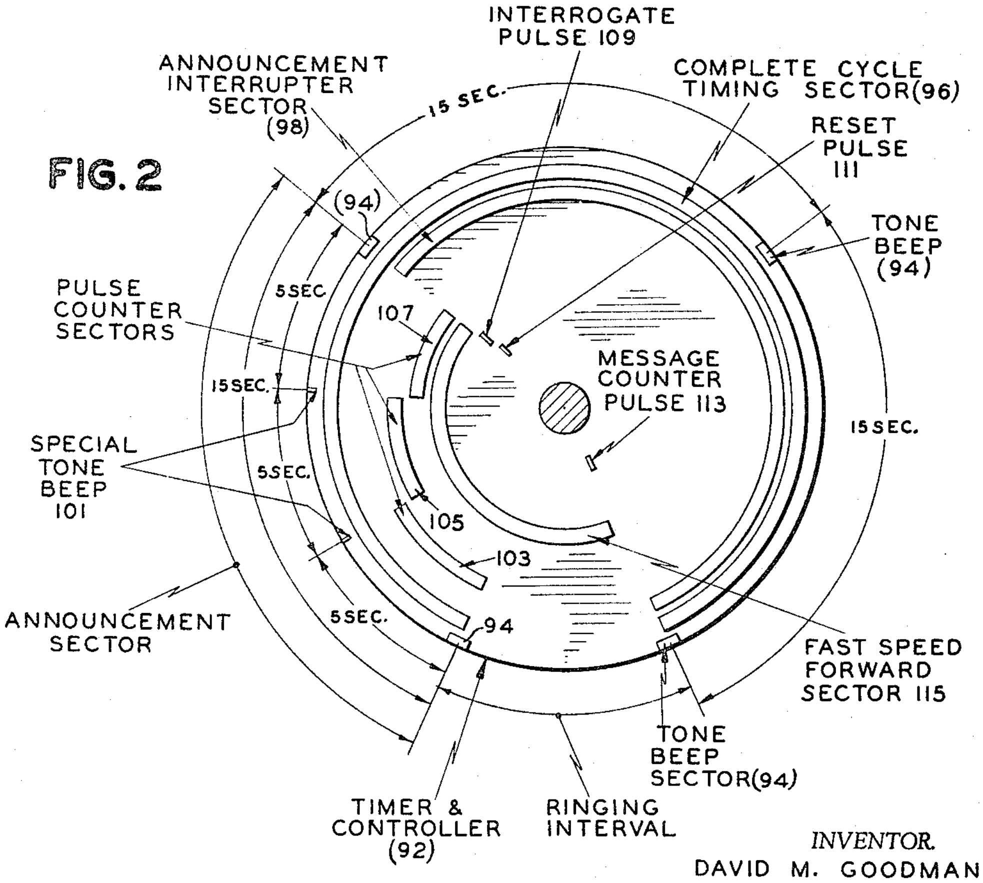
FIGURE 2 shows a timing plate of a particular fixed cycle answering device with its answering and remote control sectors.

Thus, in FIG. 2 the timing plate 92 is shown to have an announcement sector of 15 seconds, and an incoming message recording sector of 30 seconds. Segments 94 control a circuit which generates a 1400 cycle beep for transmission to the subscriber and to the calling party. Segment 96 provides a circuit which energizes the motor for a complete operating cycle consisting of delivering (transmitting) an announcement message and recording an incoming message. The announcement message is recorded on an endless recording loop. Segment 98 interrupts the transmission of the announcement message after it has once been made so that the announcement message is delivered once per cycle. These operations are all described in detail in the aforesaid patent.

To provide for the remote control functions the following segments are added to the timing plate: two tone beep sectors 101; three commutator sectors 103, 105, and 107; an interrogate pulse sector 109; a reset pulse sector 111; a message count sector 113; and a fast speed forward sector 115. The functions played by these various timing sectors is best described in detail by referring to FIG. 3 of the drawing.

Figure 3:
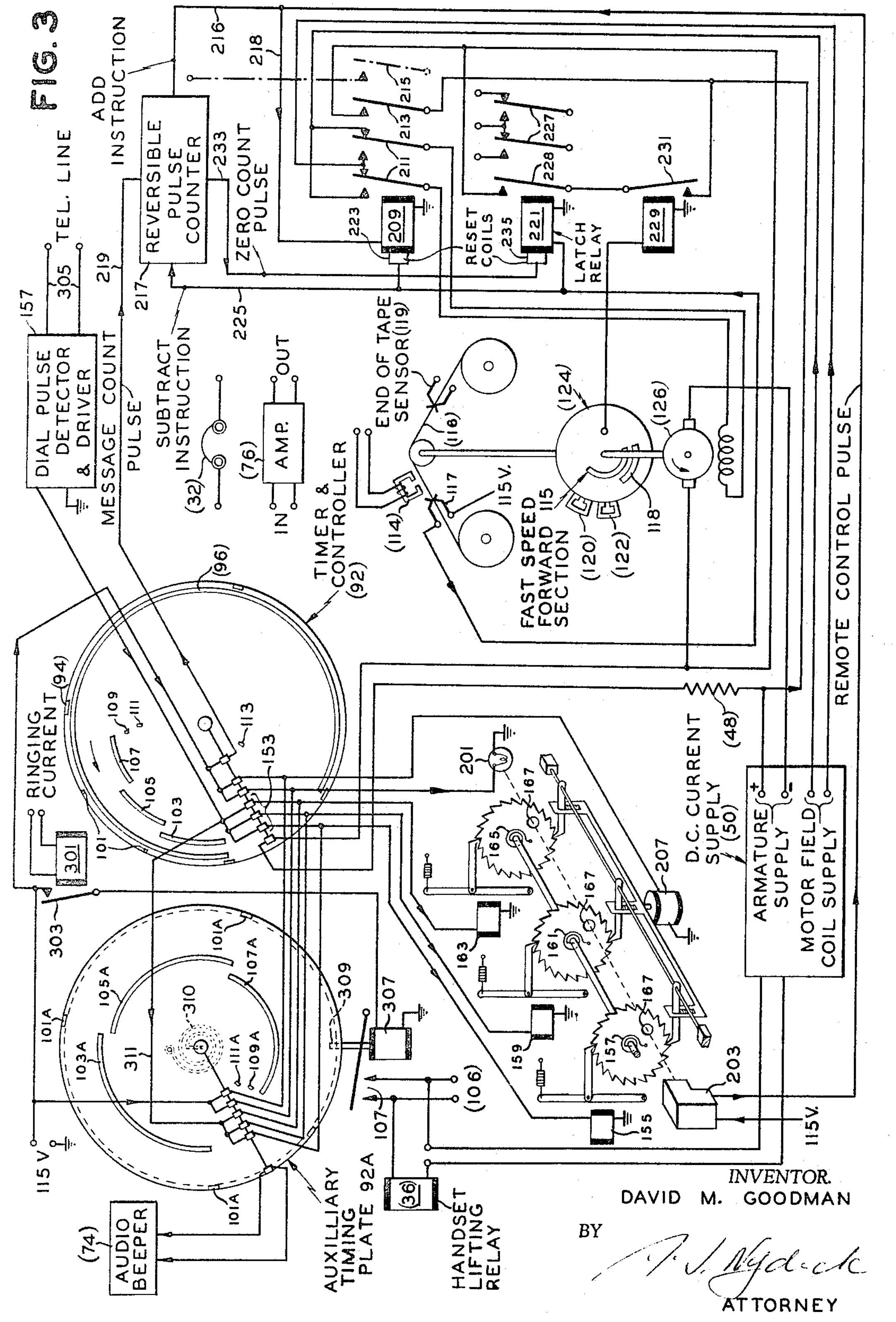
FIGURE 3 shows a remote control mechanism which is responsive to a pre-determined code signal to cause playback of previously recorded messages.

In FIG. 3 the automatic answering unit normally provides power supply 50; amplifier and audio beeper 74; amplifier and erase oscillator 76; drive motor 126; timing plate 92; announcement loop 124; magnetic heads 120, 122, and 114; a message recorder 116; and relay 36 which is in circuit with the hook switch of the telephone to perform the electrical equivalent of raising the handset. Earpiece 32 of the telephone handset, and end of tape sensor 119 are also shown. The sequence of operation is based upon the following:

(1) The subscriber has recorded an announcement message to be delivered to parties calling his home phone.

(2) The subscriber has left the answering unit in a condition to answer automatically calling parties and to record incoming messages.

(3) A number of incoming messages have been thus recorded.

(4) The subscriber is at a remote location and desires to hear the incoming messages that have been recorded. His code for this purpose is 3–7–3.

The sequence of operation is as follows:

(1) The subscriber dials, from this remote location, his home telephone number. The automatic answering unit responds and starts to deliver his previously recorded announcement message.

(2) Immediately, the subscriber dials the numeral three and releases the dial. These three dial pulses are transmitted via the telephone lines 305 to a dial pulse detector and driver 157. The output of driver 157 is three closely spaced pulses which are transmitted to the contactor assembly 153. Since conventional practice calls for dial pulses to be transmitted at the rate of approximately 10 per second these three pulses occur in 0.3 second. From container 153 the dial pulses are transmitted via commutator segment 103 to stepping relay 155 which advances the wheel 157 by three steps.

Before proceeding it should be noted that these dial pulses do not disconnect the calling party, do not create interference with other telephone lines, and conventionally are used to operate stepping switches. Accordingly, detailed descriptions of their characteristics and methods of detection are omitted. Moreover, frequency tone dialing or other dialing means that may be employed by operating telephone companies likewise are apt to exhibit the same behavior and are considered to be embraced in this aspect of the invention.

Returning to the sequence of operation, at the end of 5 seconds segment 101 on the timing plate causes a brief 1400 cycle beep to be transmitted to the subscriber. Upon hearing this beep he dials the number seven. Since commutator segment 105 now bridges the contactor assembly 153, the dial pulses activate stepping relay 159 which advances the wheel 161 by seven steps.

At the end of 10 seconds, the next segment 101 on the timing plate causes the brief 1400 cycle beep to be transmitted. When the caller hears this beep he dials the number three. Since commutator segment 107 now bridges assembly 153, the dial pulses activate stepping relay 163 which advances the wheel 165 by three steps. The three wheels 157, 161, and 165 are illustrated to be in the position corresponding to the operation just described. Since this device had a 3–7–3 code set into it, the three holes 167 line up as shown along a common axis.

Timing plate 92 continues to rotate and at the 15 second mark, corresponding to the end of the announcement cycle, commutator segment 109 transmits 115 volts to pilot lamp 201 which glows. The light therefrom is transmitted through the holes 167 to photodetector 203 which in turn generates the desired Remote Control Pulse. The timing plate 92 next carries segment 111 to a position where it introduces 115 volts to reset coil 207 in order to reset the code wheels 157, 161, and 165 to their initial positions. Thus, the three stepping relays 155, 159, and 163 are reset at the end of each announcement cycle. Therefore, if an improper combination of pulses are recorded, and the Remote Control Pulse is not generated, the machine goes through a full cycle of operations, and it is ready to interrogate the dial pulses on the next announcement cycle.

(3) When photo-detector 203 is energized the Remote Control pulse proceeds via 218 to energize latching relay 209. This does two things. First: via contacts 211 the motor field coil voltage, provided by power supply 50, is reversed so that the motor 126 starts to rewind the tape 116. Second: via contact 213 the voltage dropping resistor 48 is short circuited so that the full armature supply voltage provided by power source 50 is applied to motor 126. This causes the motor to run at high speed, in the rewind direction, which is desired.

At the start of this rewind cycle, reversible pulse counter 217 is latched via 216 by the remote control pulse, or is energized via Contacts 215 of latching relay 209, so that pulses coming in on lead 219 are counted. These pulses are generated by segment 113 on timing plate 92. Segment 113 will generate one pulse for each complete cycle that the machine runs through during the rewind process. When tape 116 is fully rewound, end-of-tape sensor 117 transmits a pulse to latch relay 221, to reset coil 223, and via lead 225 to pulse counter 217. Reset coil 223 releases latch relay 209 and contacts 211 thereof to return the field coil supply of motor 126 to its original condition so that the motor again runs in the forward direction. Contacts 213 open so that resistor 48 is inserted in the armature circuit and the motor runs forward, at regular speed, which is also desired.

During this portion of the remote control cycle the incoming messages previously recorded on tape 116 are played back to the calling party. Before describing this procedure, it is necessary to note that in the ordinary automatic answering and message recording mode of operation the telephone line 305 is in circuit with earpiece 32 which is connected to the input of amplifier 76; and the output of amplifier 76 feeds into recording head 114. Thus, incoming messages are recorded, seriatim, on tape 116. During the playback cycle, now desired, the head 114 is connected to the input of amplifier 76 and the output of the amplifier is connected to the telephone line. This result is achieved by double pole double throw switch contacts such as 227 on relay 221. Since the specific wiring would tend to complicate the drawing and since the double pole double throw switch combination of contacts 211 on relay 209 provide a similar function such details have not been shown. Accordingly, when relay 221 is energized and latched the information stored on tape 116 is picked up by magnetic head 114, transmitted to the input of amplifier 76, and then from the output of 76 is transmitted via the telephone line to the calling party, which is desired.

(4) The energization of motor 126 is derived from segment 96 on timing plate 92. It is seen that the armature supply from 50 passes through voltage dropping resistor 48, through commutator segment 96, and thence to the motor which runs forward at normal speed. Commutator segment 115 (shown on the endless loop 124 in FIG. 3 and on the timing plate in FIG. 2) serves to speed up the motor for that portion of the cycle corresponding to both the announcement message and the ringing interval. Clearly, this is desirable since the subscribed does not desire to hear his announcement message played back with each incoming message. This temporary speed up is accomplished by having the commutator segment 115 energize relay 229, which in turn short circuits resistor 48 via contacts 231 and 238, the latter contact being closed by the action of relay 221.

As the motor drives forward to play back the messages, the commutator segment 113 again feeds pulses into counting means 217. However, the end-of-tape pulse that operated reset coil 223, and latching relay 221, also operated via lead 225 to cause means 217 to subtract the pulses now received on lead 219 from the previous count. When the pulses now subtracted equal the pulses previously added, and a zero count is obtained, a reset pulse is generated at 233. This energizes reset coil 235 which opens contact 228. This causes motor 126 to stop when it has driven forward the same number of complete cycles that it had passed through during rewind.

It should be appreciated that the remote control section of the automatic answering device has now performed the precise function for which it was provided. Namely, from a remote location the subscriber was able to rewind the message tape, had the messages played back to him, and the device was left in the condition where it was before the remote control option was exercised.

Before discussing the remaining major feature of this invention a few alternative embodiments will be outlined. Reversible pulse counter 217 is shown as a block diagram inasmuch as conventional electronic counting circuits may be employed for this purpose. If desired, however, a counter arrangement using two stepping relays, two code wheels, and one reset coil akin to the arrangement of 155, 159, 157, 161, and 207 may be employed. During rewind, one stepping relay advances to a given count, and during playback the other stepping relay advances. When the playback count equals the rewind count, the two wheels are in line and a zero count pulse is generated. This pulse resets the two wheels. It also stops the motor during the playback sequence at the desired region on tape 116 by operating reset coil 235.

Referring again to the code wheels, it is practical in a three wheel system which has 729 possible codes to have another hole akin to 167 on wheel 165 which is used to provide a different remote control action. For example, there may be provided a second detector 203A which is triggered to control a set of relays (akin to 209, 221, and 229) which are used to enable the subscriber to change his announcement message. In still another example, a detector 203B may be provided which responds to a third combination of dialing pulses. This detector triggers remote control relays so that the incoming message tape is both rewound and erased. Other possibilities exist, but these three remote controls are recited because they are the most likely to be desired.

The functions of the timing plate 92 which contains the various commutator sectors can be performed by providing a plurality of cam operated switches operating in a conventional manner. Likewise end of tape sensors 117 and 119 can be provided by mechanical counters connected to operate microswitches. And, the commutator segments 103, 105, and 107 can be shortened in length by having them operate a suitable sequencing relay.

Lastly, in teams of alternative embodiments, it should be noted that the three subscriber operated switches 56, 84, and 140, described in the automatic answering device of the aforesaid U.S. Patent 2,928,898 may be modified so that manipulation of a switch operates a control relay. The contacts on this control relay then make and break all the circuits which are now made by the mechanical movement of the switch. In such an arrangement, the relays 209, 221, and 229 shown here in FIG. 3 can also be made to operate these control relays.

Returning now to the use of the remote control features by the subscriber, suppose his answering machine has recorded many incoming messages and that end-of-tape sensor 119 causes his machine to provide a "no-answer" signal. Although this condition is desirable for the ordinary caller, it is undesirable for the subscriber when he wants to dial one of his special codes into the device. For the subscriber to gain access under these conditions auxiliary timing plate 92A is provided. The manner in which this auxiliary plate operates is as follows:

(1) When the subscriber finds the "no-answer" condition prevails after he dials his home phone, he communicates with the telephone company operator and requests that the operator provide a sustained ringing current for his home phone. When this is done, slow-to-operate relay 301 responds and closes contacts 303. Relay 301, which may be thermally activated, does not respond to a normal ringing current. Therefore contacts 303 remain open except when this special ringing signal is provided by the operator. In a two wire system the ringing current is transmitted via the telephone line 305.

(2) With the closing of contacts 303, solenoid 307 operates and removes pin 309 from the auxiliary timing plate. Drive means 310, which may suitably consist of a spring motor, therefore causes timing plate 92A to rotate. Solenoid 307 also closes contacts 107 which energizes the handset lifting relay 36. This connects the answering device with the telephone line 305 and the ringing current ceases. Plate 92A continues to rotate until pin 309 re-enters the slot in the plate, which action occurs after approximately 15 seconds of rotation.

(3) As plate 92A starts its rotation contacts 101A bridge a circuit which causes audio beeper 74 to generate a 1400 cycle tone. This tone instructs the subscriber to dial his special code. When this is done the dial pulses are transmitted via lead 311 through commutator segment 103A to stepping relay 155. Code wheel 157 advances and stops. At the 5 second mark, the next section of contacts 101A causes audio beeper 74 to generate a 1400 cycle tone. The subscriber dials his next number which through commutator segment 105A operates stepping relay 159. Similarly, the third code number is dialed and via segment 107A stepping relay 163 is actuated. At the 15 second mark, contacts 109A energize lamp 201. If the correct combination has been dialed, holes 167 are in alignment, photo-detector 203 generates a Remote Control Pulse, and the same playback sequence is obtained as has already been described.

(4) To complete the action of the auxiliary timing plate 92A it is seen that contact 111A then energizes reset coil 207; and the pin 309 re-enters the slot in plate 92A bringing its rotation to a stop. With the return of pin 309, contacts 107 to relay coil 36 are opened which would disconnect the subscriber. However, the handset lifting relay 36 remains energized via contacts 106 which are bridged by commutator segment 96 of the main timing plate 92 as described in the aforesaid patent. But, since segment 96 is not active during the section of rotation corresponding to the ringing interval (see FIG. 2) it may be desirable depending upon motor speed and ringing interval to employ another set of contacts in parallel with 106 which are bridged by commutator segment 118 during the remote control cycle. The net result is that the subscriber now hears played back to him all the incoming messages recorded in his absence. That portion of the playback cycle during which his announcement message appears is speeded up, and suitably brief periods of time separate the transmission of the successive recorded messages.

Finally, a close examination of FIG. 3 reveals that to provide the foregoing remote playback capability the following elements already contained in the answering device were put to use: power supply 50; amplifiers 74 and 76; reversible dual speed motor 126; timing plate 92; announcement storage means 124; incoming message storage means 116; three recording heads 114, 120, and 122; handset lifting relay 36; speed control resistor 48; end-of-tape sensors 117 and 119; and earpiece 32 of the handset. The figure also shows that the following elements were added and connected in circuit with the above recited elements: commutator segments 103, 105, 107, 109, 111, and 113; contactor assemblies 153; auxiliary timing plate 92A and its contactor assembly; dial pulse driver 157; stepping relays 155, 159, and 163; decoding wheels 157, 161, 165; lamp 201; photo-sensitive relay 203; reset coil 207 and its associated mechanism; latching relays 209 and 221; relay 229; special ringing current detector 301; solenoid 307; and reversible pulse counter 217. These added components are all characterized by their small size and ease of manufacture which naturally results in a compact and inexpensive remote control unit.

In summary, it has been described how this invention is arranged to provide the subscriber with an easy-to-use remote control system, the operational advantages of which are substantial. To accomplish these results there were employed means to detect and count dial pulses, means to signal the subscriber when to insert the dial pulses, and control means which respond to a predetermined sequence of dial pulses. In addition, it was shown how this remote control system can be combined with existing automatic answering devices in a simple and inexpensive but attractive manner. Having thus described my invention, I claim:

1. A remote control mechanism for an automatic telephone answering device adapted to be located on a subscriber's premises comprising: first means responsive to the ordinary ringing on the telephone line for actuating the device; second means responsive to a pre-determined sequence of coded signals received after the device has been actuated; control means responsive to the output of said second means for controlling the answering device; and means alternate to said first means for actuating the device in the "no-answer" mode responsive to a signalling current different from the normal telephone ringing current.

2. The combination of claim 1 wherein said alternate means is responsive to a prolonged ringing signal.

3. An automatic telephone answering device adapted to be controlled from a remote location comprising: means responsive to a ringing current to set the device into operation; means for delivering to the calling party a pre-recorded announcement message; means for transmitting to the calling party during the interval provided for the announcement message a series of spaced apart instruction signals at least one of which is generated in the interior of the announcement cycle; and decoding means responsive to dialing pulses received during the said spaced apart instruction signals for controlling the operation of the answering device.

4. A device in accordance with claim 3 including means for interrogating the decoding means at the conclusion of the announcement cycle, said means providing a control signal when the "dial" pulses which are received correspond to a pre-determined code.

5. A device in accordance with claim 3 including means for re-setting the decoding means so that it is properly responsive to a next set of dialing pulses, and having means operative at the end of the announcement cycle for initiating the said means for re-setting.

6. An automatic telephone answering and message recording device adapted to be controlled from a remote location comprising: means responsive to a ringing current to set the device into operation; means for transmitting to the calling party a pre-recorded announcement message; means for recording incoming messages; means for transmitting to the calling party during the announcement cycle a series of spaced apart instruction signals at least one of which is generated in the interior of the announcement cycle; decoding means responsive to dialing pulses received during the said spaced apart instruction signals; and means to interrogate the decoding means in order to supply a control signal when the proper sequence of dialing pulses has been received.

7. The device defined by claim 6 including means to reset the decoding means after the means to interrogate the decoding means has been operated.

8. The device defined by claim 6 including means responsive to the control signal for playing back the recorded incoming messages, and means for transmitting these messages to the calling party.

9. The device defined by claim 8 including means for rewinding the recorded and incoming messages, first counting means operative during the rewind interval for counting the recorded incoming messages which are to be transmitted to the calling party, second counting means operative during the playback interval for counting the messages played back, and means responsive to a condition of equal counts between said first and second counting means for automatically terminating the playback of the recorded messages.

10. An automatic telephone answering and message recording device comprising: starting means responsive to a normal ringing current for connecting the telephone with the telephone line; first means for playback of an announcement message during an announcement cycle; second means for recording a plurality of incoming messages; driveable timing means; and a motor for driving said first means, second means, and timing means; means for providing a "no-answer" condition when the incoming messages have exhausted the storage capacity of said second means; in combination with remote control means comprising (1) a decoding device responsive to a predetermined sequence of dialing pulses received during the announcement cycle and (2) second starting means responsive to a special ringing signal.

11. A device in accordance with claim 10 in combination with a spring wound motor which is energized in response to said special ringing signals.

12. An automatic telephone answering device capable of being controlled from a remote location and adapted to be located on a subscriber's premises comprising: means for delivering a prerecorded announcement message to calling parties, and means responsive to ringing current on the telephone line for initiating the transmission of the pre-recorded announcement message; in combination with means for generating spaced apart audible instruction signals for transmission to the remote location, and means operatively synchronized with said instruction signals responsive to a pre-determined sequence of "dialing" pulses, which originate from the "dial" of a telephone instrument remote from the subscriber's premises, for controlling the answering device after it has responded to the ringing current.

13. A device in accordance with claim 12 wherein said means responsive to the "dialing" pulses comprises a first means for counting the number of pulses in a first group of "dialing" pulses and at least a second means for counting the number of pulses in a second group of "dialing" pulses; including means for comparing the pulses thus counted with a predetermined code, whereby a signal for controlling the answering device is generated only when the counts are aligned with the pre-determined code.

14. A device in accordance with claim 13 including means responsive to said comparing means for re-setting the counters to their initial conditions when the actual counts do not match the pre-determined code.

15. An automatic telephone answering and message recording device comprising: starting means responsive to a normal ringing current for connecting the device with the telephone line; relay means responsive to the starting means for electrically connecting circuits of the device with the telephone line; first means for transmitting to the caller a pre-recorded announcement message, said means comprising an endless message storage medium; second means for recording a plurality of incoming messages; driveable timing means; and a motor for driving said first means, second means, and timing means; said endless message medium being driven for a plurality of cycles during a complete operating cycle; means for providing a "no-answer" condition when the incoming messages have exhausted the storage capacity of said second means; and means alternate to said starting means responsive to a special ringing signal for actuating the device in the "no-answer" mode.

16. An automatic telephone answering device comprising first means for delivering a pre-recorded message during an announcement cycle in response to an incoming call, and second means for controlling the operation of the device from a remote location, said second means comprising: (1) signalling means for generating a plurality of spaced apart audible instruction signals for transmission to the calling party, at least one of said audible signals occurring in the interior of the announcement cycle thereby dividing the announcement cycle into intervals; and (2) decoding means, responsive to dial pulses transmitted from the remote location, which provide a control signal for operating the device when said dial pulses are received within said intervals in accordance with a pre-determined code.

References Cited

UNITED STATES PATENTS

| | | | |
|---|---|---|---|
| 1,302,767 | 5/1919 | Clausen et al. | 179—18 |
| 2,533,234 | 12/1950 | Edwards | 179—6 |
| 2,928,898 | 3/1960 | Salzberg | 179—6 |
| 2,998,488 | 8/1961 | Peterson | 179—6 |
| 3,136,856 | 6/1964 | Zimmermann | 179—6 |

BERNARD KONICK, *Primary Examiner.*

A. BERNARD, P. SPERBER, *Assistant Examiners.*